United States Patent [19]

Netravali et al.

[11] 4,245,248
[45] Jan. 13, 1981

[54] MOTION ESTIMATION AND ENCODING OF VIDEO SIGNALS IN THE TRANSFORM DOMAIN

[75] Inventors: Arun N. Netravali, Matawan; John A. Stuller, West Long Branch, both of N.J.

[73] Assignee: Bell Telephone Laboratories, Incorporated, Murray Hill, N.J.

[21] Appl. No.: 27,053

[22] Filed: Apr. 4, 1979

[51] Int. Cl.³ .............................................. H04N 7/12
[52] U.S. Cl. ....................................... 358/136; 358/105
[58] Field of Search ............... 358/133, 135, 136, 105; 364/515, 521

[56] References Cited

U.S. PATENT DOCUMENTS

| | | | |
|---|---|---|---|
| 3,632,865 | 1/1972 | Haskell et al. | 358/136 |
| 3,679,821 | 7/1972 | Schroeder | 358/136 |
| 3,984,626 | 10/1976 | Mounts et al. | 358/133 |
| 4,193,096 | 3/1980 | Stoffel | 358/133 |

OTHER PUBLICATIONS

Roese et al.–Interframe Cosine Transform Image Coding–IEEE Trans. on Comm., vol. com–25, #11, Nov. 1977, pp. 1329–1339.
Jones–A Conditional Replenishment Hadamard Video Compressor–SPIE vol. 119–App. of Dig. Image Proc., (10CC 1977), pp. 91–98.
Knauer–Realtime Video Compression Algorithm for Hadamard Transform Processing–SPIE vol. 66, (1975), Eff. Trans. of Pict. Info., pp. 58–69.
Reader et al.–Orthogonal Transform Coding of Still and Moving Pictures, PHD Thesis, Univ. of Sussex Dec. 1973.

*Primary Examiner*—Robert L. Griffin
*Assistant Examiner*—Joseph A. Orsino, Jr.
*Attorney, Agent, or Firm*—Barry H. Freedman; Ronald D. Slusky

[57] ABSTRACT

Video signals are encoded (FIG. 5) using motion compensated prediction which operates on a transform domain representation of the signal. The displacement estimate used for compensation is recursively updated, so that a feedback path exists between the output (205) of the displacement calculator and one of its output (209). The update term is also computed in the transform domain. A decoder (FIG. 6) uses the same prediction technique to recover the original picture.

22 Claims, 6 Drawing Figures

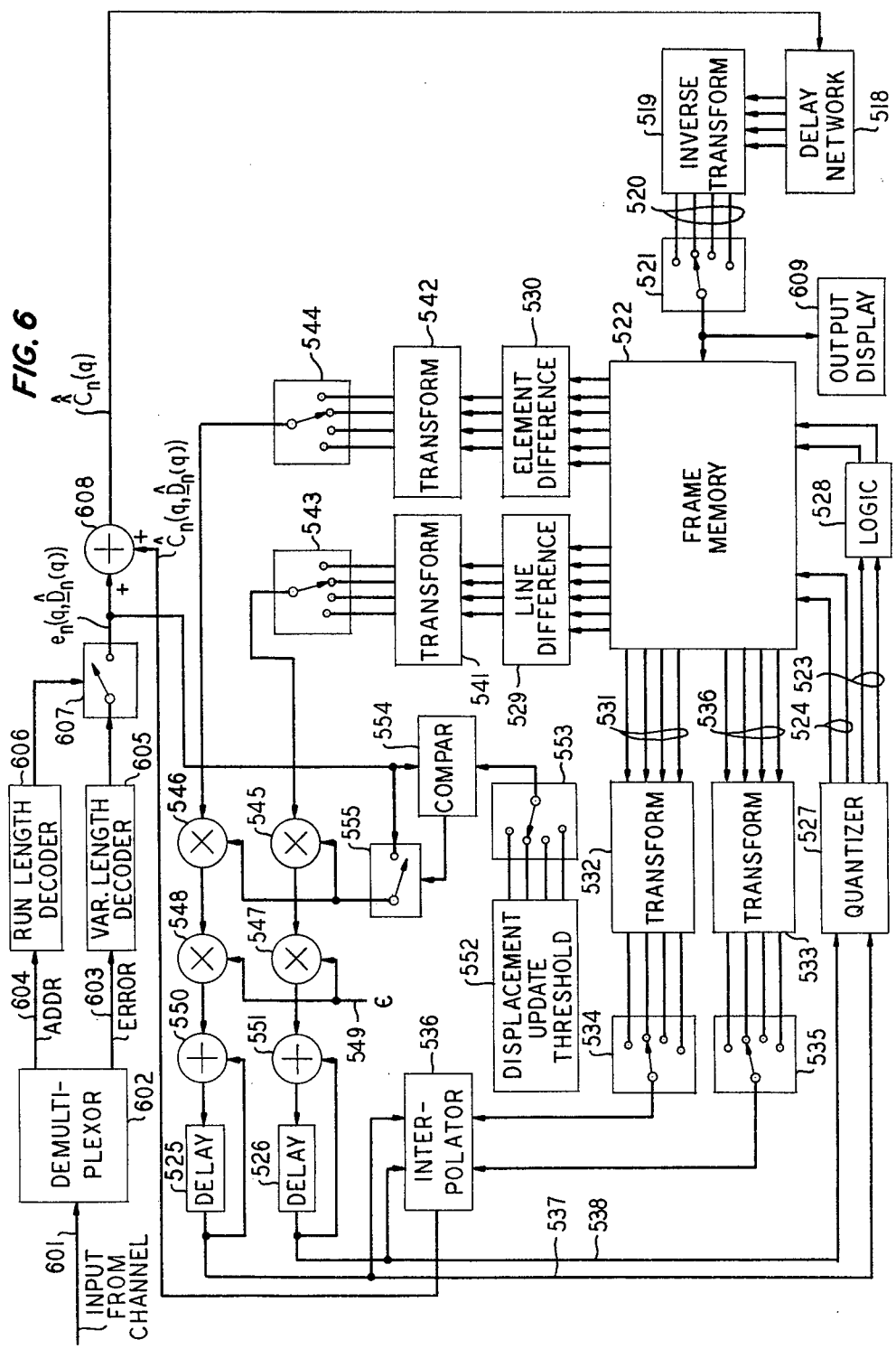

MOTION ESTIMATION AND ENCODING OF VIDEO SIGNALS IN THE TRANSFORM DOMAIN

BACKGROUND OF THE INVENTION (1) Field of the Invention

This invention relates to a technique for estimating the displacement and/or velocity of objects in a picture using a transform domain representation of the picture, and a related technique for encoding the transform coefficient of the picture using motion compensation.

(2) Description of the Prior Art

In various prior art video encoding systems, it has been found advantageous to partition individual frames of video data into blocks or groups of picture elements, and to perform a two-dimensional, generally linear transformation of each block so as to generate a set of transform coefficients. These coefficients are then used for prediction purposes, i.e., the transform coefficients of a given block of pels in the previous (reference) frame are used to predict the corresponding coefficient values for the present frame. If the prediction error exceeds a threshold, the error value is quantized and encoded for transmission. If the threshold is not exceeded, it is assumed that the inaccuracy caused by not encoding the error value is tolerable. The quantized error values add, as correction terms, to the predicted transform coefficients. In the decoder, the coefficients are applied to an inverse transform circuit to recover a replica of the original video signal.

Interframe hybrid transform/DPCM coders of the type described achieve compression by the redundancy reduction implicit in the prediction process and also by the fact that some coefficients can be reproduced with low precision (or totally omitted) without visibly degrading the reconstructed image. An advantage of interframe hybrid transform/DPCM coding over conventional three-dimensional block interframe coding of the type described in S. C. Knauer, "Real-Time Video Compression Algorithm for Hadamard Transform Processing", *Proceedings of SPIE*, Vol. 66, August 1975, pp. 58–69, is that the hybrid coder requires only a single frame of storage, while the conventional transform coder requires several frame stores. Different transformation techniques have been successfully employed, including cosine and Hadamard transforms. See, for example, C. Reader, "Orthogonal Transform Coding of Still and Moving Pictures", Ph.D. Dissertation, The University of Sussex, United Kingdom, 1974; J. A. Roese, W. K. Pratt and G. S. Robinson, "Interframe Cosine Transform Image Coding", *IEEE Transactions on Communications*, COM-25, No. 11, November 1977, pp. 1329–1339; and H. W. Jones, "A Conditional Replenishment Hadamard Video Compressor", *SPIE*, Vol. 119, Applications of Digital Image Processing, 1977, pp. 91–98. Haar, Slant and Karhunen-Loeve transforms have also been used.

While significant redundancy reduction is achieved with interframe hybrid transform coders, the availability of inexpensive processing circuitry makes further efficiency improvement possible, and this indeed is the broad object of the present invention. Naturally, it is desirable that the encoded signal faithfully reproduce the original input, when decoded, and that storage requirements (as opposed to processing circuits) be kept to a minimum.

SUMMARY OF THE INVENTION

In accordance with the present invention, a transform domain representation of a video signal is encoded using motion compensated prediction, wherein the transform coefficients for a given block of pels is predicted using the coefficients for a displaced block of pels in the previous (reference) frame. Advantageously, the displacement estimate is recursively updated, so that each estimate uses the previous estimate to make the next computation, and so that the estimated displacement ideally converges to its true value. Still further, the displacement calculation is made, in accordance with the invention, in the transform domain, rather than in the pel domain.

BRIEF DESCRIPTION OF THE DRAWING

The present invention will be readily appreciated by consideration of the following detailed description in conjunction with the accompanying drawing in which:

FIG. 6 is a block diagram of a decoder arranged to recover the original picture from the encoded signal output from the encoder of FIG. 5.

DETAILED DESCRIPTION

Figure 1:
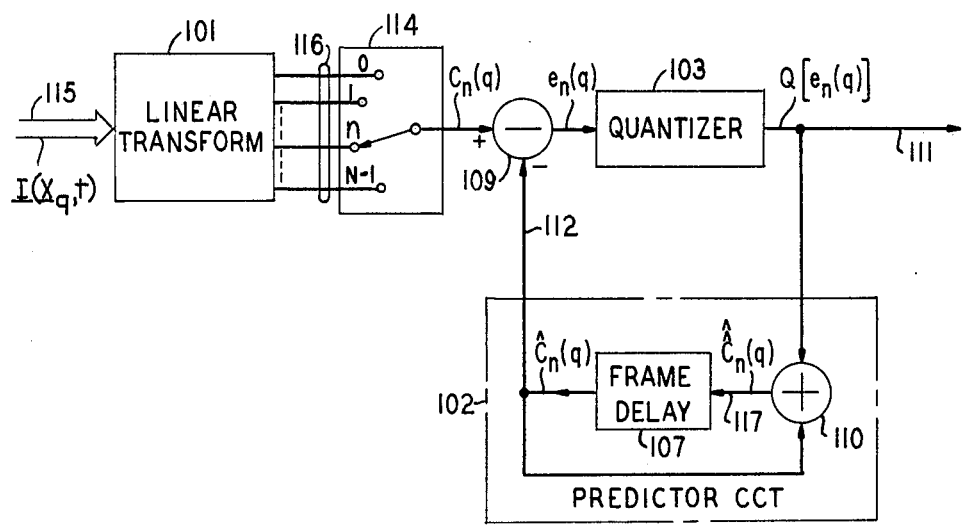
FIG. 1 is a block diagram of a prior art hybrid transform/DPCM interframe video encoder.

In FIG. 1, a prior art hybrid transform/DPCM interframe video encoder is shown in block diagram form. The coder may use any well-known type of linear transformation circuit 101 to convert the intensity values of a block (group) of N picture elements to a corresponding set of N coefficients. The intensity values are input on lines 115, generally from a video scanner and sampler, and can be loaded in serial or parallel form; the coefficients are output on lines 116, generally in parallel form, so that individual coefficient values are made available by a multiplexing switch 114, which sequentially connects each coefficient to one input of a subtraction circuit 109. Mathematically, the input intensity value is represented as $I(x_q,t)$, where $x_q$ is the vector location of the $q^{th}$ block of pels and t is the time corresponding to the presently processed picture element. The output coefficients are $C_0(q)$, $C_1(q)$, $C_2(q)$ ... $C_{N-1}(q)$, such that $$I(x_q,t) = \sum_{n=0}^{N-1} C_n(q)\phi_n \quad (1)$$

where the $\{\phi_n\}$ are the transform basis vectors. Some of the transforms which may be used in circuit 101 are Hadamard, Haar, Slant and cosine transforms, all of which are well known in picture processing.

For each transform coefficient $C_n(q)$ input to subtraction circuit 109 from circuit 101, a prediction $\hat{C}_n(q)$ is made, using the coefficient value from the corresponding block of pels in the previous frame. The prediction is made in a predictor designated generally as 102, and applied to the other input of subtractor 109 on line 112. The difference between the true value and the predicted value is an error value $e_n(q)$ which is applied to a quantizer 103. The quantizer output, designated $Q[e_n(q)]$, is the output of the encoder on line 111, and can be further processed by comparison with a threshold, or by run length coding, to cite two examples.

Predictor 102 includes an adder circuit 110 which combines the quantized error value $Q[e_n(q)]$ with the predicted coefficient value $\hat{C}_n(q)$, on line 117. This sum is a reconstructed coefficient value $\tilde{C}_n(q)$, which is then applied to a delay circuit 107, which provides a delay time of one frame interval $\tau$. The output of delay circuit 107 is the predicted coefficient value $\hat{C}_n(q)$.

In the encoder of FIG. 1, it is assumed that the transform coefficients for the block of pels in the previous frame which spatially correspond to the block of pels presently being processed, will be good predictors of the present frame transform coefficients, thus making the prediction errors desirably small. This assumption, while valid, is improved upon, in accordance with the present invention, by realizing that transform coefficients of a displaced block of pels in the previous frame would be even better predictors of the present transform coefficients, if the displacement represented the movement of objects in the picture which occurred in the time interval between the present and previous frame. Stated differently, motion compensation of the type used in the pel domain (see, for example, application Ser. No. 21071 of A. N. Netravali and J. D. Robbins entitled "Method and Apparatus for video Signal Encoding with Motion Compensation" filed Mar. 16, 1979) can be used to advantage in the transform domain. This is illustrated in FIG. 2, which is a generalized block diagram of a motion compensated video signal encoder for transform domain coefficients.

Figure 2:
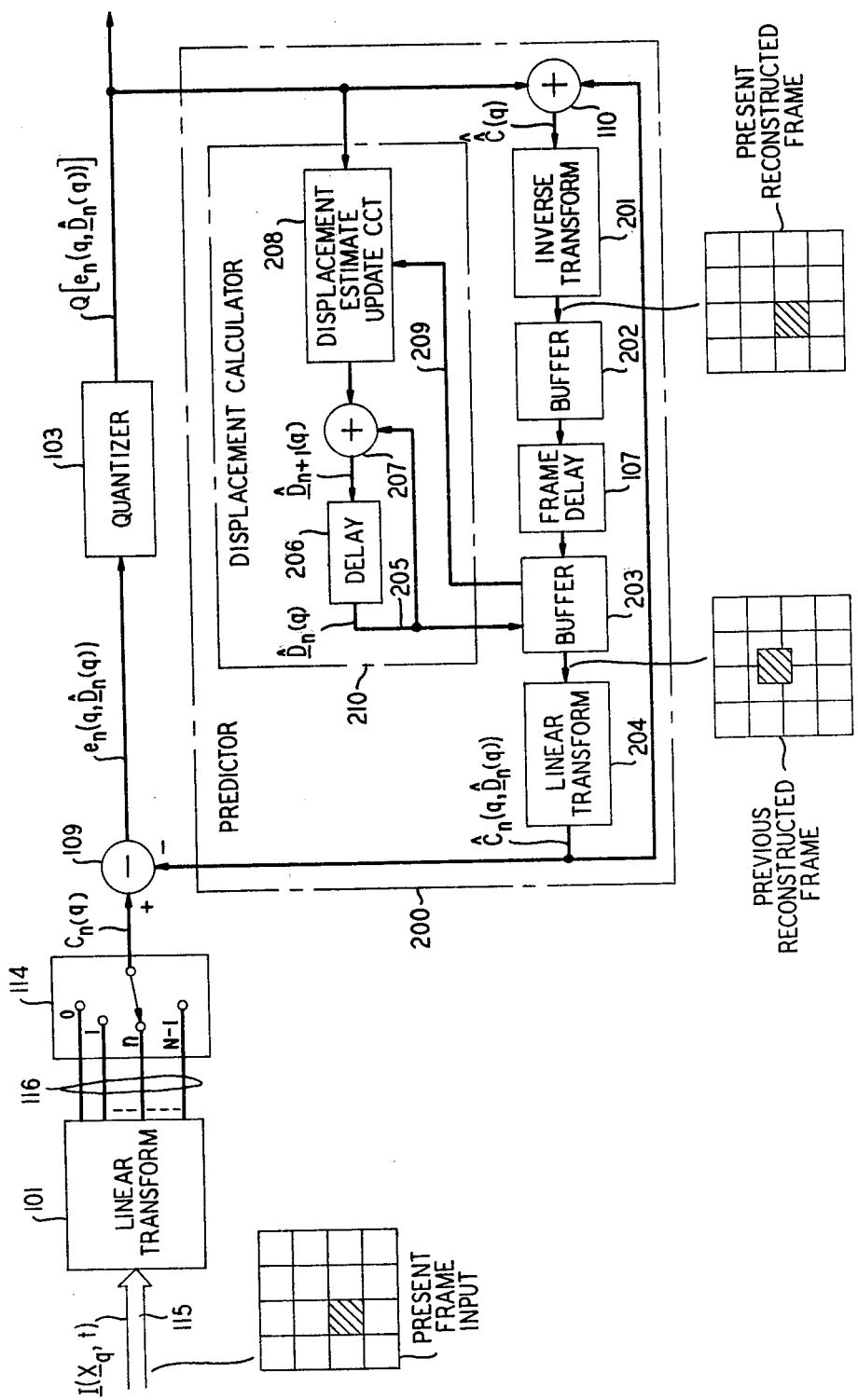
FIG. 2 is a generalized block diagram of a motion compensated encoder using a transform domain representation of a video signal.

In FIG. 2, elements like those in FIG. 1 retain the same designations. For example, the input video signal is applied on lines 115 to linear transformation circuit 101, and the transform coefficients on lines 116 are multiplexed via switch 114 into one input of subtraction circuit 109. The second input to circuit 109 is a motion compensated prediction of the transform coefficient presently being processed, which is written $\hat{C}_n(q,\hat{D}_n(q))$, where $\hat{D}_n(q)$ represents the $n^{th}$ displacement estimate for the $q^{th}$ block of pels; the displacement estimate is a two-dimensional vector (indicated by underscoring), and is recursively updated in accordance with the present invention, in a manner described below. Using similar notation, the error output from subtraction circuit 109, which is the difference between the predicted and true coefficient values, is designated $e_n(q,\hat{D}_n(q))$, and the quantized value of the same quantity (output from quantizer 103) is designated $Q[e_n(q,\hat{D}_n(q))]$.

The significant difference between the hybrid encoder of FIG. 1 and the motion compensated coder of FIG. 2 is, of course, in the predictor 200 disposed in the feedback path. In FIG. 2, the predictor output $\hat{C}_n(q,\hat{D}_n(q))$ is combined with the quantized error $Q[e_n(q,\hat{D}_n(q))]$ in adder 110, and then applied to an inverse transform circuit 201, which is arranged to convert the reconstructed transform coefficients back to intensity values. For this purpose, circuit 201 would be the precise complement of transformation circuit 101. The intensity values recovered from inverse transform circuit 201 are entered in buffer 202, until all of the N intensity values from the $q^{th}$ block of pels have been processed. The values are then applied to a frame delay circuit 107, the output of which is entered in a buffer 203, which thus contains the decoded intensity values for the picture elements in the preceeding frame. Buffer 203 may include a random access memory of conventional design.

In accordance with the invention, the intensity values recalled from buffer 203 and used in the transform coefficient prediction depend upon the displacement estimate $\hat{D}_n(q)$ which is applied to buffer 203 on line 205. The intensity values output from the buffer are those in a block of pels displaced vector distance $\hat{D}_n(q)$ from the original location of the $q^{th}$ block, and the intensity values of these displaced pels are reconverted into the transform domain by application of the buffer output to linear transformation circuit 204, which is identical to circuit 101. The output of transformation circuit 204 is $\hat{C}_n(q,\hat{D}_n(q))$, which is input to subtraction circuit 109 and to adder circuit 110.

The displacement estimate $\hat{D}_n(q)$ on line 205 is stored in a delay element 206 and recursively updated. For this purpose, an adder circuit 207 combines the estimate with an update term generated by a displacement update circuit 208 (explained below), and the new estimate $\hat{D}_{n+1}(q)$ is input to delay element 206. Update circuit 208 receives two inputs, the first $Q[e_n(q,\hat{D}_n(q))]$ from the encoder output and the second from buffer 203 on line 209. The latter input represents the intensity values in the neighborhood of the displaced block specified by $\hat{D}_n(q)$, which is fed back to buffer 203 on line 205.

While the present invention can be used with numerous different displacement estimation techniques, its success depends to a large extent on the accuracy with which displacement is calculated. In accordance with an important aspect of the present invention, displacement update circuit 208 is arranged to perform a coefficient-by-coefficient recursion, in the transform domain, as illustrated with reference to FIG. 3, where a two-by-two transform block 301 which includes pel intensities a, b, c, d is shown in a present frame 300. The transform coefficients for the pels in this block will be denoted by $C_1$, $C_2$, $C_3$, $C_4$ and $\hat{D}_n$ will be used to represent an initial estimate of displacement which exists prior to encoding the coefficients of block 301 for transmission. To update $\hat{D}_n$, a block 302 of pels is located in the previous frame 310. This block of pels is displaced by the vector distance $\hat{D}_n$ (arrow 304) from a block 303 of pels which is in the same spatial position as block 301. The picture intensities in displaced block 302 are denoted $a_1$, $b_1$, $c_1$ and $d_1$ and the transform coefficients for this block are denoted $C_1^1$, $C_2^1$, $C_3^1$, $C_4^1$. The displacement estimate is now updated by a term proportional to the product of (a) the difference between one set of corresponding coefficients for the present block 301 and previous frame displaced block 302 and (b) a coefficient gradient vector which is computed by obtaining transform coefficient values for intensity differences rather than intensity values. The differences are computed using the intensities $a_1$, $b_1$, $c_1$ and $d_1$ in the previous frame displaced block 302. Mathematically, the update is expressed as follows:

$$\hat{D}_{n+1} - \hat{D}_n = \text{update} = \epsilon \cdot [C_1 - C_1^1] \cdot \text{col}[C_1(\text{EDIF}), C_1(\text{LDIF})]. \quad (2)$$

In Equation (2), the quantity "col[$C_1$(EDIF),$C_1$(LDIF)]" denotes the spatial gradients obtained by computing coefficient $C_1$ using element differences (EDIF) and line differences (LDIF) instead of the pel intensity values $a_1$, $b_1$, $c_1$, $d_1$. Specifically, line differences at pel locations of block 302 are used to compute the spatial gradient coefficient $C_1$ in the vertical direction and element differences at these locations are used to compute the spatial gradient in the horizontal direction. Separate displacement estimates for horizontal and vertical directions are separately updated, and the components are then vectorially combined to compute the overall displacement estimate. The term $C_1 - C_1^1$ represents the difference between the value of a given coefficient calculated using (a) intensities in the present frame and (b) intensities in the displaced block in the previous frame. This difference is equivalent to the prediction error $e_n(q, \hat{D}_n(q))$ associated with that coefficient.

The new displacement estimate $\hat{D}_{n+1}$ is then used for locating a block 302' of pels in the previous frame 310, which is displaced spatially from the present frame block 303 by $\hat{D}_{n+1}$. The coefficient $C_2^2$ for this displaced block is calculated using intensity values $a_2$, $b_2$, $c_2$ and $d_2$ and the following rule is then used for updating $\hat{D}_{n+1}$:

$$\hat{D}_{n+2} = D_{n+1} - \epsilon \cdot [C_2 - C_2^2] \text{col}[C_2(\text{EDIF}), C_2(\text{LDIF})]. \quad (3)$$

In Equation (3), the coefficient $C_2$ is evaluated using element and line differences, and these differences are in turn computed using $a_2$, $b_2$, $c_2$ and $d_2$.

The process of updating described in Equations (2) and (3) above is recursive, and uses the previous displacement estimate in the updating process. Thus, in Equation (3), the coefficient $C_2^2$ is evaluated using the pel values in block 302', which is displaced by $D_{n+1}$, and the coefficient gradient is also computed using values derived from block 302'. The foregoing process is continued for all coefficients in one block, and then from block to block, using the same technique. When going from one block to the next, the last displacement estimate from the prior block is used in updating the first estimate for the new block. In all of the above, it is assumed that if the displacement estimate $\hat{D}_n$ is a nonintegral number, in terms of pel-distance, then the intensities and coefficients of the displaced block are obtained by interpolation.

The recursion of Equations (2) and (3) are generalized as follows:

$$\text{Update} = \epsilon \cdot [C_k - C_k^k] \cdot \text{col}[C_k(\text{EDIF}), C_k(\text{LDIF})] \quad (4)$$

where $k = 1, 2 \ldots J$, and N is the number of coefficients in each block. $C_k^k$ is the value of the $k^{th}$ coefficient derived from a spatially displaced block of the previous frame, and $C_k$ is the value of the same ($k^{th}$) coefficient of the present block. The difference is thus the prediction error $e_k(q, \hat{D}_k(q))$ for the $k^{th}$ coefficient of block (q).

Various computational alternatives should be mentioned at this point. First, the order in which the coefficients within a block are processed need not be $C_1$, $C_2$, $C_3 \ldots C_N$, but can vary adaptively, depending upon the type of scene. However, it is generally desirable to use the most significant coefficients first. Second, although the example of FIG. 3 used four pels per block, other block sizes could be used, and a recursion could be performed more or less frequently than four times per block. Third, $\epsilon$, which is a scaling factor, can be made to depend upon the coefficient value as well as on the type and amount of displacement estimated. Finally, several simplifications can be made in the interpolation process, such that displacement updates are only used if they exceed a threshold.

Figure 3:
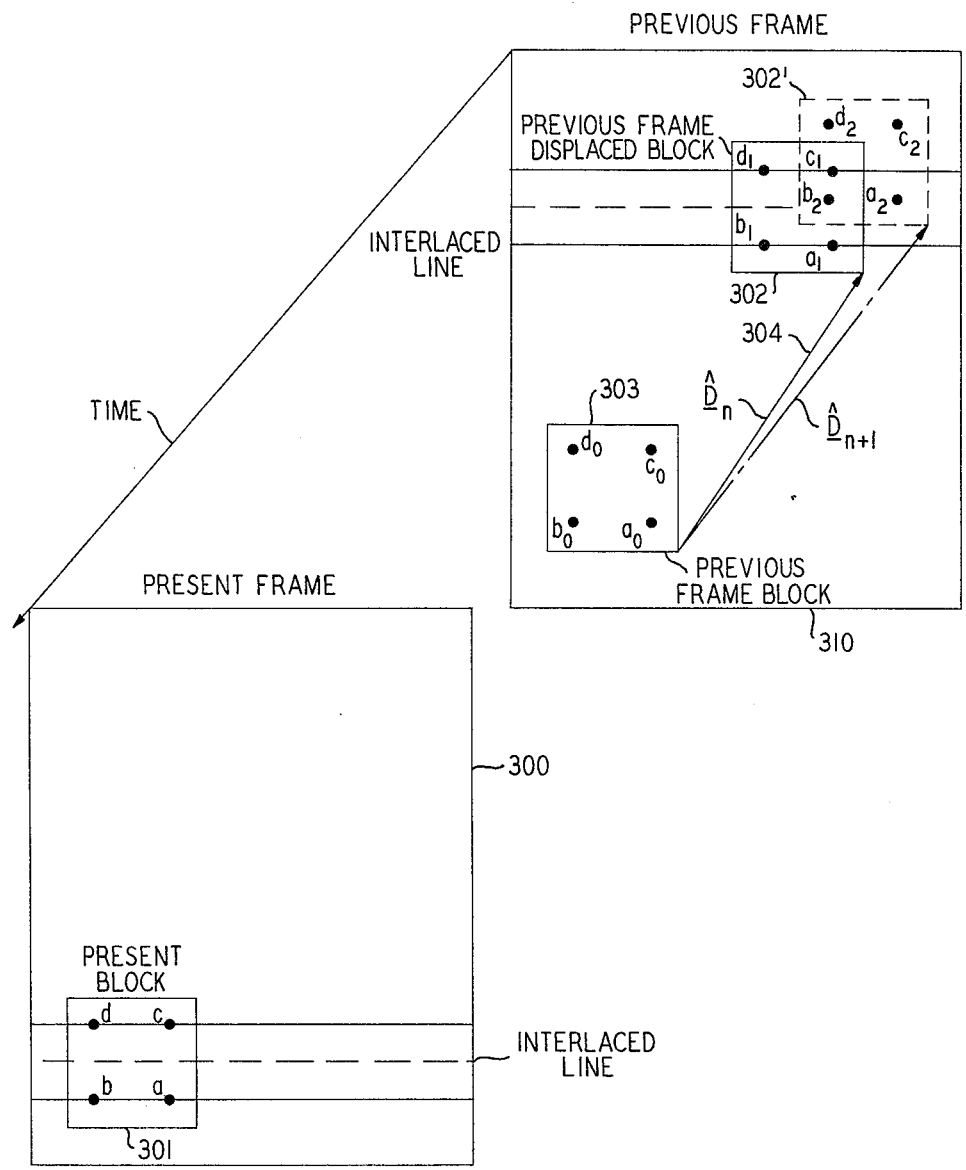
FIG. 3 is an illustration of the relative locations of blocks of picture elements in the present and previous frames which are used to make motion compensated predictions.

FIG. 3 also graphically illustrates the difference between the present invention and the prior art encoders of a type shown in FIG. 1. In the latter, the coefficients of the present block 301 are predicted by the coefficients of the corresponding previous frame block 303, which has picture elements with intensity values $a_0$, $b_0$, $c_0$ and $d_0$. In the present invention, the coefficients of the displaced block 302 are used instead to make the prediction.

Figure 4:
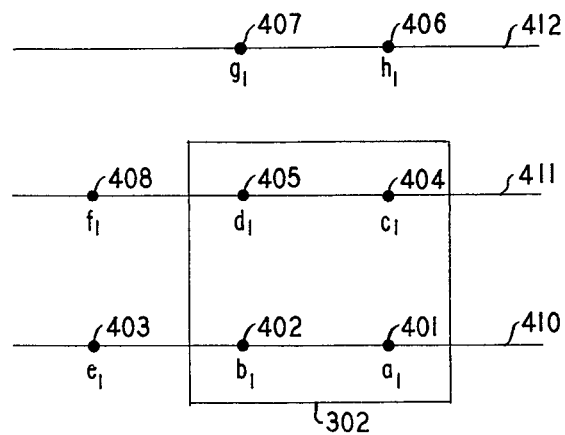
FIG. 4 illustrates one block of picture elements and the neighboring pels which are used to form line and element differences.

The manner in which element and line differences are calculated is illustrated in FIG. 4, which shows the intensity values $a_1$, $b_1$, $c_1$ and $d_1$ for block 302. The element difference (EDIF) for pel 401 having intensity $a_1$ is $a_1 - b_1$, which is the difference between pel 401 and the preceeding pel 402 on the same scan line 410. Similarly, the element difference for pel 402 is $b_1 - e_1$, where $e_1$ is the intensity of pel 403, which lies outside of block 302 but which neighbors the block. EDIF for pel 404 on line 411 is $c_1 - d_1$, and $d_1 - f_1$ for pel 405.

Line differences are formed using the intensity values of corresponding picture elements in adjacent scan lines. Thus, LDIF for pel 401 is $a_1 - c_1$ and LDIF for pel 402 is $b_1 - d_1$. For pels 404 and 405, the line difference is $c_1 - h_1$ and $d_1 - g_1$, respectively, thus using values for pels 406 and 407 from the preceeding scan line 412.

The quantities in Equation (2) are then computed using the appropriate line and element differences. For example, $c_1$(EDIF) is computed as shown in the following Table:

TABLE 1

| |
|---|
| For $a_1$ use $a_1 - b_1$ |
| for $b_1$ use $b_1 - e_1$ |
| for $c_1$ use $c_1 - d_1$ |
| for $d_1$ use $d_1 - f_1$ |

$C_1$ (LDIF) is also computed as follows:

TABLE 2

| |
|---|
| For $a_1$ use $a_1 - c_1$ |
| for $b_1$ use $b_1 - d_1$ |
| for $c_1$ use $c_1 - h_1$ |
| for $d_1$ use $d_1 - g_1$ |

It should be noted here that element and line differences could be computed in two slightly modified ways. First, the intensity difference between a given pel and the succeeding (not previous) pel could be used. Thus, for pel 405, EDIF would be $c_1 - d_1$ and LDIF would be $b_1 - d_1$. Second, the average between previous and succeeding pels could be used. Thus, for pel 405, EDIF would be $\frac{1}{2}(c_1 - f_1)$ and LDIF would be $\frac{1}{2}(b_1 - g_1)$. These alternatives should not significantly affect overall system performance.

Figure 5:
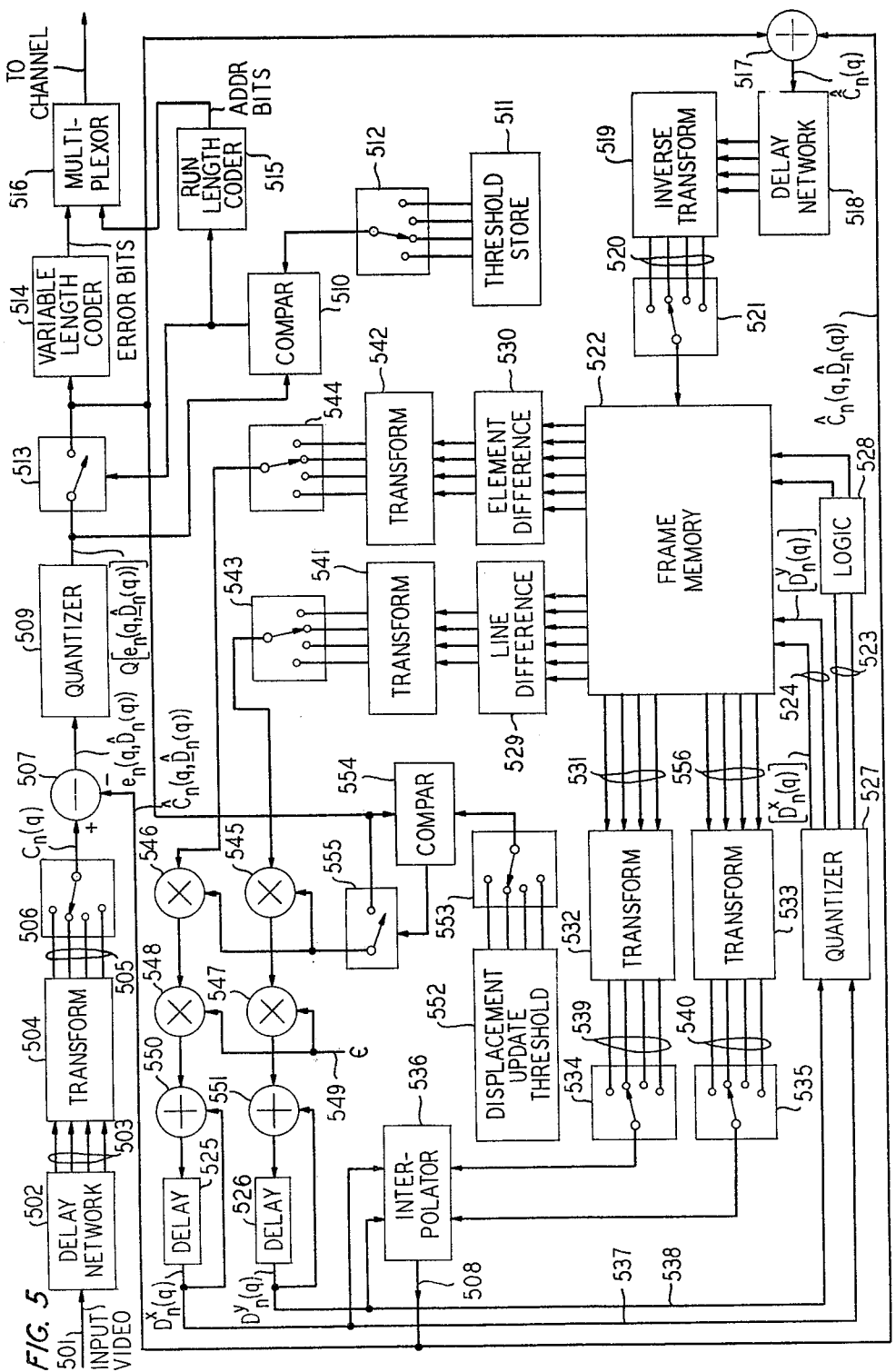
FIG. 5 is a detailed block diagram of a motion compensated encoder arranged in accordance with the present invention.

The displacement estimates obtained with the above recursion are used, in turn, to predict the value of the transform coefficient being encoded, and the prediction is compared with the true value to yield a coefficient error. In a preferred embodiment, the value of this error is only transmitted when it exceeds a threshold; in this embodiment, the addresses of the coefficients for which the prediction error exceeds the threshold are also encoded. An overall block diagram of such an encoder, constructed in accordance with the present invention, is shown in FIG. 5.

Input video signals on line 501 are first converted to parallel form in a delay network 502. While four outputs 503 are shown, thus indicating four pels per block, other block sizes could be used. The intensity values are then applied to a transform circuit 504, which can compute any desired one of the types of linear transform coefficients mentioned previously; the transform coefficients are output on lines 505 in parallel form, and are converted to serial form before application to one input of subtraction circuit 507, by virtue of a multiplexing switch 506. This switch, and others like it in FIGS. 5 and 6, is stepped at a predetermined rate, which is desirably a multiple of the sampling rate for the input video signal.

The second input to subtraction circuit 507 on line 508 is the displacement compensated coefficient prediction $\hat{C}_n(q, \hat{D}_n(q))$, which is subtracted from the present coefficient value $C_n(q)$ to yield a prediction error $e_n(q, \hat{D}_n(q))$. This value is quantized in quantizer 509. The quantized output $Q[e_n(q, \hat{D}_n(q))]$ is applied to one input of a comparator 510. The other input to the comparator is one of the threshold values stored in a threshold store circuit 511; the particular threshold is determined by the position of a switch 512, which operates in unison with switch 506. This arrangement permits a different threshold to be used for each coefficient error value. Generally speaking, the threshold for "important" coefficients (for example, low frequency coefficients) will be lower than for coefficients whose value does not significantly affect the reconstructed picture.

If the threshold value is exceeded, the output of comparator 510 is high, closing a switch 513 so as to couple the quantized prediction error value $Q[e_n(q, \hat{D}_n(q))]$ output from quantizer 509 to a variable length encoder 514. If the error is suitably small, switch 513 remains open, and the coefficient error value is not encoded. In either event, the output of comparator 510, which indicates the locations for which error values are (or are not) encoded, is input to a run length coder, which provides address information to the receiver. The outputs of variable length encoder 514 and run length encoder 515 are appropriately formatted in multiplexer 516, the output of which is transmitted to a remote location for subsequent decoding.

The coefficient prediction error values (or zero's, if switch 513 is open) are combined with the corresponding predicted coefficient values on lines 508, in an adder circuit 517, so as to obtain reconstructed coefficient values $\tilde{C}_n(q)$, which are the same as those available at the receiver. The values for a complete block of pels are accumulated in a buffer or delay network 518, and applied in parallel to an inverse transform circuit 519, for reconversion from coefficient values to intensity values. The intensity values appear in parallel form on line 520, and are then applied, one at a time, to a frame memory 522, via a demultiplexing switch 521, which operates at the same rate as switch 512. The intensity values are stored in the same sequence as in the original picture being processed.

Frame memory 522, which may comprise a conventional random access memory, is arranged to provide several sets of outputs, representing intensity values of particular blocks of picture elements in the previously processed frame. These outputs are used for two purposes: to predict the coefficient values for the next block of picture elements using motion compensation, and to update the previous displacement estimate, the horizontal and vertical components of which are stored in a pair of delay elements 525 and 526, respectively. These components, designated $D_n^x(q)$ and $D_n^y(q)$, are applied via lines 537 and 538 to a quantizer 527, which is arranged to provide two sets of outputs. The first set of outputs, on lines 524, is the integral portion $[D_n^x(q)]$ and $[D_n^y(q)]$ of the displacement estimate, while the second set of outputs on lines 523, is the fractional portion $FD_n^x(q)$ and $FD_n^y(q)$ of the same estimate. The integral portions are applied directly to frame memory 522, and are used to locate a first block of pels in the previous frame which is nearest in location to the displacement estimate. The stored intensity values for this block are output from memory 522 on lines 531. The fractional portion of the displacement estimate is applied to a logic circuit 528, which constructs outputs which identify the location of a second block of pels next nearest to the displacement estimate, and applies them to memory 522. The intensity values for pels in this second block are output from memory 522 on lines 556.

The pel values on lines 531 and 556 are applied to a pair of transform circuits 532 and 533, each of which is identical to transform circuit 504. As a result, the transform coefficients for the two blocks of pels nearest and next nearest to the displacement estimate are output on lines 539 and 540. These coefficients are applied, one pair at a time, to an interpolator 536, by multiplexer switches 534 and 535 which operate in unison. Interpolator 536 receives the unquantized displacement values from delay elements 525 and 526, and provides an interpolated coefficient value on line 508. In accordance with the present invention, this value is the motion compensated prediction of the coefficient value then being processed.

The displacement values $[D_n^x(q)]$ and $[D_n^Y(q)]$ input to memory 522 on lines 524 are also used to recall stored intensity values needed to recursively update the displacement values using equations like (2) and (3). Specifically, memory 522 provides the intensity values of the pels in the previous frame needed to form line and element differences to a pair of subtraction or difference circuits 529 and 530. In the example of FIG. 4, circuit 529 would receive the intensity values of pels 401, 402, 404 and 405 within the block 302 specified by $[D_n^x(q)]$ and $[D_n^y(q)]$ and pels 406 and 407 on the previous line. Circuit 530 would receive the four pels within block 302 and the preceding pels 403 and 408 which enable formation of element differences. The appropriate difference values, as specified in Tables 1 and 2, are then applied to a pair of transform circuits 541 and 542, which are identical to circuit 504.

The coefficient values output from transform circuits 541 and 542 represent the spatial gradients obtained by computing the coefficients using line and element differences, respectively, instead of actual intensity values. These coefficients are applied, a pair at a time, to first inputs of multipliers 545 and 546, by virtue of multiplexer switches 543 and 544, which operate in unison. With switch 555 closed, the second input to each multiplier is derived from the output of switch 513, which is the quantized error value $Q[e_n(q, \hat{D}_n(q))]$ when switch 513 is closed. This error value represents the difference between the coefficient value being processed and its motion compensated predicted value, and thus is the second term $(C_K - C_K{}^K)$ in equation (4). Outputs of each multiplier are applied, in turn, to multipliers 547 and 548, each of which is arranged to multiply the aforesaid input by the scaling factor $\epsilon$ (generally in the range $10^{-5} < \epsilon < 10^{-2}$) present on line 549. The outputs of multipliers 547 and 548 are the update terms for the horizontal and vertical displacement values stored in delay elements 525 and 526, respectively. Each update is added to the previously stored value in a pair of adders 550 and 551.

When switch 513 is open, indicating that the prediction error value is smaller than a threshold value stored in store 511, a zero factor is applied to the multipliers, resulting in no update term. If desired, a second set of displacement update threshold values may be stored in a store 552, and an appropriate value selected by multiplexer switch 553 may be compared with the error value from switch 513. If the threshold is not exceeded, switch 555 remains open, again providing for a zero update term.

Logic circuit 528, which converts the fractional part of the displacement estimate to the next nearest integral value (for each of its x and y components), may comprise a series of algebraic circuits which compute the difference between the input value and all possible surrounding integral values. The selection is then made by a series of comparators, each comparing one difference with the previous comparator result.

The information encoded by the apparatus of FIG. 5 is decoded, in accordance with the present invention, as shown in FIG. 6. In this figure, components identical to those in FIG. 5 retain the same reference designators.

Input code words representing both prediction error values and address information are received on line 601 and applied to a demultiplexer 602 which performs the inverse function of multiplexer 516. The error words appearing on line 603 are coupled to a variable length decoder 605, which performs the functional inverse of variable length coder 514 of FIG. 5, while the encoded address information is decoded in run length decoder 606, which is the functional inverse of run length coder 515 of FIG. 5. It is to be noted here that the run length and variable length encoders/decoders of FIGS. 5 and 6, and multiplexer/demultiplexer 516, 602, are quite conventional and well known to those skilled in the art. If desired, even more sophisticated techniques may be used to further process the motion compensated coefficient prediction error values which are the subject of the present invention.

The decoded address information output from decoder 606 is used to control the position of switch 607, such that decoded coefficient prediction error values from decoder 605 are applied to one input of adder 608 in the appropriate temporal position. This corresponds to the action of switch 513 in FIG. 5, which was closed only when the coefficient error value exceeded a threshold. When switch 607 is open, a "zero" value is applied to adder circuit 608, indicating that the coefficient error value was below the threshold and therefore not encoded.

The second input to adder circuit 608 is the motion compensated predicted coefficient value $\hat{C}_n(q, \hat{D}_n(q))$ output from interpolator 536. The output of adder circuit 608 (which thus corresponds to adder circuit 517 of FIG. 5) is the reconstructed coefficient value $\hat{C}_n(q)$, which can be retransformed into the intensity domain to recover the original picture information. An output display 609, which receives intensity values from inverse transform circuit 519, may be provided to receive the picture, if desired.

The remaining circuitry in FIG. 6 is identical to that of FIG. 5, and is used to perform the two functions mentioned previously, namely, the formation of a motion compensated prediction value for each transform coefficient, and the recursive updating of the displacement estimate used in the prediction. To this end, the reconstructed coefficient values $\hat{C}_n(q)$ for a block of pels is accumulated in delay network 518, and the intensity values for the block, recovered via inverse transform circuit 519, are entered in frame memory 522 via switch 521. The frame memory receives the vertical and horizontal components of the previous displacement estimates from delay elements 525 and 526, via quantizer 527 which separates the integral portion thereof, and via logic 528, which uses the fractional portion to determine the location of the block of pels nearest to the block selected by the integral portion. The intensity values for pels in the two blocks just mentioned are converted to corresponding transform coefficients in transform circuits 532 and 533, and the coefficients are sequentially applied to interpolator 536 via multiplex switches 534 and 535. The interpolator, as stated previously, provides the predicted value $C_n(q, \hat{D}_n(q))$ by interpolating between each pair of input values, based upon the displacement estimates on lines 537 and 538.

Frame memory 522 also uses the displacement information to recursively update the displacement estimate, by providing appropriate pel intensity values to difference circuits 529 and 530, which compute line and element differences, respectively. These differences are converted from the intensity to the transform domain in transform circuits 541 and 542, and the coefficients are applied, one at a time, to first inputs of multipliers 545 and 546, via multiplexer switches 543 and 544. The second inputs to the multipliers are derived from the prediction error value output from switch 607. Comparator 554 compares threshold values in store 552 with the error value, and maintains switch 555 closed when the threshold is exceeded. With either switch 607 or 555 open, a "zero" is input to the multipliers, yielding a zero update term.

The outputs of multipliers 545 and 546 are in turn multiplied by the scaling coefficient $\epsilon$ on line 549, by virtue of multipliers 547 and 548. The update terms thus produced in accordance with equation (4) are combined with the previous displacement estimates using adder circuits 550 and 551.

It will be apparent to those skilled in the art that various modifications and adaptations can be made to the above-described embodiments of the present invention without departing from the spirit and scope of the invention as a whole. Accordingly, it is intended that the invention be limited only by the following claims.

We claim:

1. A method of encoding a video signal including a series of samples representing the intensities of elements of a picture, including the steps of:
   (a) linearly transforming the intensity values for a first block of picture elements (pels) to a corresponding set of coefficient values,
   (b) predicting the values of said coefficients, and
   (c) encoding an error signal indicative of the difference between ones of said coefficient values and the predicted values thereof,
   wherein said predicting step is CHARACTERIZED BY (d) estimating the displacement of objects in said picture between a previous frame and the present frame, and (e) predicting said values using the coefficients of a second block of pels in said previous frame which is displaced from said first block by said estimate.

2. The invention defined in claim 1 wherein said estimating step includes recursively updating each estimate as a function of the previous estimate.

3. The method defined in claim 2 wherein said updating step includes forming an update term proportional to the product of (a) said difference between a coefficient value and the corresponding predicted value thereof, and (b) a coefficient gradient of said second block of pels.

4. The method defined in claim 3 wherein said encoding step includes:

(1) comparing said difference to a threshold value, and (2) encoding said difference only if said threshold value is exceeded.

5. A method of encoding a series of intensity values each representing an element of a picture, comprising the steps of:

(a) transforming the intensity values for a block of pels to a series of coefficients representative thereof, (b) predicting the value of said coefficients based upon the value of coefficients for a block of pels in a previous frame of said picture, and (c) encoding a prediction error signal representing the difference between the actual and predicted values of ones of said coefficients, wherein said predicting step is CHARACTERIZED BY (d) selecting said block of pels in said previous frame in accordance with an estimate of the displacement of objects in said picture occurring between said previous frame and the present frame.

6. The method defined in claim 5 wherein said selecting step includes updating each displacement estimate as a function of the previous displacement estimate.

7. The method defined in claim 6 wherein said updating step includes:

(1) storing each displacement estimate, and (2) combining each stored estimate with a term proportional to the product of said difference between actual and predicted values and a coefficient gradient of said block of pels in said previous frame.

8. The method defined in claim 7 wherein said coefficient gradient is obtained by the steps of:

(1) forming line and element differences of the pels in said previous frame block, and (2) transforming said differences to a series of coefficients representative thereof according to the transformation of step (a).

9. The method defined in claim 8 wherein said transforming step comprises a Hadamard transformation.

10. A method of encoding a video signal which includes a series of samples each indicating the intensity of an element of a picture, including the steps of:

(1) converting the intensity values for a first block of pels to a series of coefficient values through a linear transformation, (2) predicting the values of each of said coefficients based upon stored intensity values for elements in a previous frame of said picture, and (3) encoding said signal as a function of the difference between predicted and actual coefficient values,

CHARACTERIZED BY (4) estimating the displacement of objects in said picture occurring in the period between said prior frame and the present frame, and (5) selecting stored values for a second block of pels for said prediction based upon said displacement estimate.

11. The method defined in claim 10 wherein said estimating step includes updating each estimate each time said signal is encoded, as a function of the prior estimate.

12. A method of encoding a video signal which includes a series of samples each indicating the intensity of an element of a picture, including the steps of:

(1) converting the intensity values for a first block of pels to a series of coefficient values through a linear transformation.

(2) predicting the values of each of said coefficients based upon stored intensity values for elements in a previous frame of said picture, and (3) encoding said signal as a function of the difference between predicted and actual coefficient values,

CHARACTERIZED BY (4) estimating the displacement of objects in said picture occurring in the period between said prior frame and the present frame, said estimating step including updating each estimate each time said signal is encoded, as a function of the prior estimate, and (5) selecting stored values for said prediction based upon said displacement estimate, said selecting step including interpolating coefficient values derived from said previous frame to yield the coefficient values for a second block of pels displaced from said first block by said displacement estimate.

13. The method of claim 12 wherein said update is proportional to the product of (a) said difference between predicted and actual coefficient values and (b) a coefficient value calculated using element and line differences for pels in said second block.

14. The method defined in claim 13 wherein said encoding step includes comparing said difference to a predetermined threshold value.

15. Apparatus for encoding a series of intensity values each representing an element of a picture, comprising:

(a) means (101) transforming the intensity values for a block of pels to a series of coefficients representative thereof, (b) means (200) for predicting the value of said coefficients based upon the value of coefficients for a block of pels in a previous frame of said picture, and (c) means (103) for encoding a prediction error signal representing the difference between the actual and predicted values of ones of said coefficients, wherein said predicting means is CHARACTERIZED BY (d) means (203, 210) for selecting said block of pels in said previous frame in accordance with an estimate of the displacement of objects in said picture occurring between said previous frame and the present frame.

16. The invention defined in claim 15 wherein said selecting means includes means (208) for updating each displacement estimate as a function of the previous displacement estimate.

17. The invention defined in claim 16 wherein said selecting means includes:
  (1) means (206) for storing each displacement estimate, and
  (2) means (207) for combining each stored estimate with a term proportional to the product of said difference between actual and predicted values and a coefficient gradient in said block of pels in said previous frame.

18. Apparatus for encoding a video signal which includes a series of samples each indicating the intensity of an element of a picture, including:
  (1) means (101) for converting the intensity values for a first block of pels to a series of coefficient values through a linear transformation,
  (2) means (200) for predicting the values of each of said coefficients based upon stored intensity values for elements in a previous frame of said picture, and
  (3) means (103) for encoding said signal as a function of the difference between predicted and actual coefficient values,
  CHARACTERIZED BY
  (4) means (210) for estimating the displacement of objects in said picture occurring in the period between said prior frame and the present frame, and
  (5) means (203) for selecting stored values for a second block of pels for said prediction based upon said displacement estimate.

19. The invention defined in claim 18 wherein said estimating means includes means (208) for updating each estimate each time said signal is encoded, as a function of the prior estimate.

20. Apparatus for encoding a video signal which includes a series of samples each indicating the intensity of an element of a picture, including:
  (1) means (101) for converting the intensity values for a first block of pels to a series of coefficient values through a linear transformation,
  (2) means (200) for predicting the values of each of said coefficients based upon stored intensity values for elements in a previous frame of said picture, and
  (3) means (103) for encoding said signal as a function of the difference between predicted and actual coefficient values,
  CHARACTERIZED BY
  (4) means (210) for estimating the displacement of objects in said picture occurring in the period between said prior frame and the present frame, wherein said estimating means includes means (208) for updating each estimate, each time said signal is encoded, as a function of the prior estimate, and
  (5) means (203) for selecting stored values for said prediction based upon said displacement estimate, wherein said selecting means includes means (536) for interpolating coefficient values derived from said previous frame to yield coefficient values for a second block of pels displaced from said first block by said displacement estimate.

21. The invention of claim 20 wherein said updating means (208) is arranged to form an output proportional to the product of (a) said difference between predicted and actual coefficient values and (b) a coefficient value calculated using element and line differences for pels in said second block.

22. The invention defined in claim 21 wherein said encoding means includes means (510) for comparing said difference to a predetermined threshold value.

* * * * *

UNITED STATES PATENT AND TRADEMARK OFFICE
CERTIFICATE OF CORRECTION

PATENT NO.  : 4,245,248
DATED       : January 13, 1981
INVENTOR(S) : Arun N. Netravali and John A. Stuller It is certified that error appears in the above-identified patent and that said Letters Patent are hereby corrected as shown below:

Column 2, line 63, the first portion of the equation reading "$I(x_q,t)$" should read --$\underline{I}(\underline{x}_q,t)$--. Column 3, line 50, "$\hat{C}_n(q,\hat{D}_n(q))$, where $\hat{D}_n(q)$" should read --$\hat{C}_n(q,\underline{\hat{D}}_n(q))$, where $\underline{\hat{D}}_n(q)$--; line 58, "$e_n(q,\hat{D}_n(q))$" should read --$e_n(q,\underline{\hat{D}}_n(q))$--; line 60, "$Q[e_n(q,\hat{D}_n(q))]$" should read --$Q[e_n(q,\underline{\hat{D}}_n(q))]$--; line 65, "$\hat{C}_n(q,\hat{D}_n(q))$" should read --$\hat{C}_n(q,\underline{\hat{D}}_n(q))$--; line 66, "$Q[e_n(q,\hat{D}_n(q))]$" should read --$Q[e_n(q,\underline{\hat{D}}_n(q))]$--. Column 4, line 15, "$\hat{D}_n(q)$ should read --$\underline{\hat{D}}_n(q)$--; line 17, "$\hat{D}_n(q)$" should read --$\underline{\hat{D}}_n(q)$--; line 24, "$\hat{C}_n(q,D_n(q))$" should read --$\hat{C}_n(q,\underline{D}_n(q))$--; line 26 "$\hat{D}_n(q)$" should read --$\underline{\hat{D}}_n(q)$--; line 31, "$\hat{D}_{n+1}(q)$" should read --$\underline{\hat{D}}_{n+1}(q)$--; line 32,

UNITED STATES PATENT AND TRADEMARK OFFICE
CERTIFICATE OF CORRECTION

PATENT NO. : 4,245,248
DATED : January 13, 1981
INVENTOR(S) : Arun N. Netravali and John A. Stuller It is certified that error appears in the above-identified patent and that said Letters Patent are hereby corrected as shown below:

"$Q[e_n(q,\hat{D}_n(q))]$" should read --$Q[e_n(q,\hat{\underline{D}}_n(q))]$--; line 36, "$\hat{D}_n(q)$" should read --$\hat{\underline{D}}_n(q)$--; line 48, "$\hat{D}_n$" should read --$\hat{\underline{D}}_n$--; line 51, "$\hat{D}_n$" should read --$\hat{\underline{D}}_n$--; line 53, "$\hat{D}_n$" should read --$\hat{\underline{D}}_n$--; line 63, "differences" should read --<u>differences</u>--.

Column 5, line 1, Equation (2) should read:

--$\hat{\underline{D}}_{n+1} - \hat{\underline{D}}_n$ = update = $\varepsilon \cdot [C_1 - C_1^1] \cdot \text{col}[C_1(\text{EDIF}), C_1(\text{LDIF})]$--;

line 21, "$e_n(q,\hat{D}_n(q))$" should read --$e_n(q,\hat{\underline{D}}_n(q))$--; line 25, "$\hat{D}_{n+1}$" should read --$\hat{\underline{D}}_{n+1}$--; line 28, "$\hat{D}_{n+1}$" should read --$\hat{\underline{D}}_{n+1}$--; line 29, Equation (3) should read:

--$\hat{\underline{D}}_{n+2} = \hat{\underline{D}}_{n+1} - \varepsilon \cdot [C_2 - C_2^2]\text{col}[C_2(\text{EDIF}), C_2(\text{LDIF})]$--; line 39, "$D_{n+1}$" should read --$\underline{D}_{n+1}$--; line 47, "$\hat{D}_n$" should read --$\hat{\underline{D}}_n$--;

line 56, "...J," should read --...N,--; line 61, "$e_k(q,\hat{D}_k(q))$"

UNITED STATES PATENT AND TRADEMARK OFFICE
CERTIFICATE OF CORRECTION

PATENT NO. : 4,245,248

DATED : January 13, 1981

INVENTOR(S) : Arun N. Netravali and John A. Stuller

It is certified that error appears in the above-identified patent and that said Letters Patent are hereby corrected as shown below:

should read --$e_k(q,\hat{\underline{D}}_k(q))$--. Column 6, line 55, "succeeding"

should read --succeeding--. Column 7, line 21, "$\hat{C}_n(q,\hat{D}_n(q))$"

should read --$\hat{C}_n(q,\hat{\underline{D}}_n(q))$--; line 24, "$Q[e_n(q,\hat{D}_n(q))]$" should read --$Q[e_n(q,\hat{\underline{D}}_n(q))]$--; line 37, "$Q[e_n(q,\hat{D}_n(q))]$" should read --$Q[e_n(q,\hat{\underline{D}}_n(q))]$--. Column 8, line 65, "$Q[e_n(q,\hat{D}_n(q))]$"

should read --$Q[e_n(q,\hat{\underline{D}}_n(q))]$--. Column 9, line 62,

"$\hat{C}_n(q,\hat{D}_n(q))$" should read --$\hat{C}_n(q,\hat{\underline{D}}_n(q))$--. Column 10, line 25, "$C_n(q,\hat{D}_n(q))$" should read --$C_n(q,\hat{\underline{D}}_n(q))$--.

Signed and Sealed this

Sixteenth Day of March 1982

[SEAL]

Attest:

GERALD J. MOSSINGHOFF

Attesting Officer

Commissioner of Patents and Trademarks